(12) United States Patent
Nishimura (10) Patent No.: US 7,684,912 B2
(45) Date of Patent: Mar. 23, 2010

(54) ELECTRIC POWER STEERING APPARATUS

(75) Inventor: Akihiko Nishimura, Aichi (JP)

(73) Assignee: JTEKT Corporation, Osaka (JP)

( * ) Notice: Subject to any disclaimer, the term of this patent is extended or adjusted under 35 U.S.C. 154(b) by 333 days.

(21) Appl. No.: 11/719,262

(22) PCT Filed: Nov. 11, 2005

(86) PCT No.: PCT/JP2005/020701

§ 371 (c)(1),
(2), (4) Date: May 14, 2007

(87) PCT Pub. No.: WO2006/051894

PCT Pub. Date: May 18, 2006

(65) Prior Publication Data

US 2009/0143938 A1   Jun. 4, 2009

(30) Foreign Application Priority Data

Nov. 12, 2004  (JP) .............................. 2004-329388

(51) Int. Cl.
*A01B 69/00* (2006.01)
(52) U.S. Cl. .......................... 701/41; 701/42; 180/412; 180/446; 318/432
(58) Field of Classification Search ............... 701/41, 701/42; 180/400, 412, 413, 446; 318/140, 318/432, 433, 503

See application file for complete search history.

(56) References Cited

U.S. PATENT DOCUMENTS

| | | | |
|---|---|---|---|
| 5,473,231 A | 12/1995 | McLaughlin et al. | |
| 5,504,403 A | 4/1996 | McLaughlin | |
| 6,161,068 A * | 12/2000 | Kurishige et al. | 701/41 |

FOREIGN PATENT DOCUMENTS

| | | |
|---|---|---|
| JP | 2838053 B2 | 10/1998 |
| JP | 2002-059860 A | 2/2002 |
| JP | 2002-104220 A | 4/2002 |
| JP | 2002-211429 A | 7/2002 |
| JP | 2002-249061 A | 9/2002 |

* cited by examiner

*Primary Examiner*—Gertrude Arthur Jeanglaud
(74) *Attorney, Agent, or Firm*—Darby & Darby P.C.

(57) ABSTRACT

An electric power steering apparatus is provided for suppressing the effect on the steering wheel of external interference inputted from the tie rod. The apparatus includes first and second output units for outputting first and second control amounts in accordance with the outputted torque signal, except in a dead zone thereof, respectively. The apparatus also includes gain data output units for, when the torque signal, a steering angular velocity, and a vehicle speed are within predetermined ranges, outputting gain data respectively. Steering operation is assisted by an electric motor driven on the basis of the first and second control amounts and the gain data, which afford a control signal to the motor.

7 Claims, 7 Drawing Sheets

ELECTRIC POWER STEERING APPARATUS

CROSS-REFERENCE TO PRIOR APPLICATIONS

This is a U.S. national phase application under 35 U.S.C. §371 of International Patent Application No. PCT/JP2005/020701, filed Nov. 11, 2005, and claims the benefit of Japanese Application No. 2004-329388, filed Nov. 12, 2004, both of which are incorporated by reference herein. The International Application was published in Japanese on May 18, 2006 as International Publication No. WO 2006/051894 A1 under PCT Article 21(2).

BACKGROUND

1. Field

The present invention relates to an electric power steering apparatus which includes a torque detecting device for detecting a torque applied to a steering member, controlling means for outputting a control amount in response to the torque detected by the torque detecting device while having a dead zone of the torque where the control amount is not outputted, and an electric motor arranged to be controllably driven in response to the control amount outputted from the controlling means for assisting the steering action.

2. Description of Related Art

An electric power steering apparatus installed in a vehicle is designed for assisting the steering action of the vehicle with the help of an electric motor and includes, in a steering mechanism having a steering member and a steering shaft joined together, a torque sensor for detecting the torque of the steering action received by the steering member and an electric motor for assisting the steering action of the steering mechanism, whereby the electric motor can be driven in response to the steering torque detected by the torque sensor for generating a force of assisting the steering action to ease the steering force on the steering member. Also, the force of assisting the steering action can be determined in relation to the speed of the vehicle so that the steering force on the steering member is not too small during the running at high speeds of the vehicle.

Disclosed in Japanese Patent Application Laid-Open No. 2002-249061 is a current controller unit in an electric power steering apparatus which comprises a first current controller for outputting a first control signal corresponding to a difference between the target current and the present current in the electric motor, an external interference voltage estimator for estimating from the target voltage signal and the present current an external interference voltage induced on the electric motor, a second current controller for outputting a second control signal in response to an output of the external interference voltage estimator, and adding means for summing the output of the first current controller and the output of the second current controller to output the target voltage signal. The external interference voltage estimator includes a high-pass filter of second or higher order provided at least at either the input side or the output side.

Disclosed in Japanese Patent No. 2838053 (U.S. Pat. No. 5,473,231 and 5,504,403) is a controller unit in an electric assist steering system which includes mixture filtering means which comprises first filter means for having a first function characteristic at a torque frequency smaller than the mixture frequency and second filter means for having a second function characteristic at a torque frequency larger than the mixture frequency, the first filter means and the second filter means being connected in parallel to each other for providing a torque signal mixed and filtered by the first and second filter means, and controlling means operationally connected to the mixture filtering means for providing a control signal to steering assisting means in response to the torque signal mixed and filtered by the mixture filtering means, whereby the torque signal is filtered by the mixture filtering means to maintain its selectable system frequency range during the operation of the system.

SUMMARY

When a force of external interference such as braking vibrations is inputted from the tie rod joined to the wheel, it may be transmitted via the steering wheel to a driver. Every conventional electric power steering apparatus, however, fails to control the sensitivity at upper stream or minimize the effect on the steering wheel of external interference inputted from the tie rod. The controlling action may be attempted only with much difficulty for definitely switching between the action of minimizing the effect of external interference and the steering action substantially at 10 Hz which represents a boundary between the frequency of the steering torque signal during the periodical steering action and the frequency of the steering torque signal under the effect of external interference.

An object is to provide an electric power steering apparatus by which the controlling action can definitely be switched between the steering action and the action of attenuating the force of external interference inputted from the tie rod thus to minimize the effect of external interference on the steering wheel.

An electric power steering apparatus according to an aspect has a torque detecting device for detecting torque applied to a steering member, first controlling means for outputting a control amount in response to a torque signal outputted from the torque detecting device while having a dead zone of the torque signal where the control amount is not outputted, and an electric motor arranged to be controllably driven with the control amount outputted from the first controlling means for assisting the steering action. In particular, the electric power steering apparatus includes phase advancing filter means for, when the frequency of the torque signal is lower than a first frequency, attenuating and outputting the torque signal, and when the frequency of the torque signal is higher than a second frequency which is higher than the first frequency, advancing the phase and outputting the torque signal, second controlling means for outputting the control amount in response to the torque signal outputted from the phase advancing filter means while having a dead zone of the torque signal where the control amount is not outputted, torque gain outputting means for, when the torque signal detected by the torque detecting device remains within a predetermined range, outputting gain data, means for detecting the steering angular velocity of the steering member, angular velocity gain outputting means for, when the steering angular velocity detected by the detecting means remains within a predetermined range, outputting gain data, vehicle speed gain outputting means for, when the provided vehicle speed is higher than a predetermined rate, outputting gain data, means for multiplying the gain data outputted from the torque gain outputting means, the gain data outputted from the angular velocity gain outputting means, the gain data outputted from the vehicle speed gain outputting means, and the control amount outputted from the second controlling means, and means for adding the resultant product calculated by the multiplying means with the control amount outputted from the first controlling means.

In the electric power steering apparatus according to an aspect, the first frequency is 7.5 Hz and the second frequency is 10 Hz.

The electric power steering apparatus according to the aspects allows the phase advancing filter means to, when the frequency of the provided torque signal is lower than the first frequency, attenuate and output the torque signal, and when the frequency of the torque signal is higher than the second frequency which is higher than the first frequency, advance the phase and output the torque signal. The second controlling means outputs the control amount in response to the torque signal outputted from the phase advancing filter means while having the dead zone where the control amount is not outputted. The torque gain outputting means outputs the gain data only when the torque signal detected by the torque detecting device remains within a predetermined range.

The angular velocity gain outputting means outputs the gain data only when the steering angular velocity remains within a predetermined range while the vehicle speed gain outputting means outputs the gain data only when the provided vehicle speed is higher than a predetermined rate. The multiplying means multiplies the gain data from the torque gain outputting means, the gain data from the angular velocity gain outputting means, the gain data from the vehicle speed gain outputting means, and the control amount from the second controlling means while the adding means adds the resultant product with the control amount outputted from the first controlling means.

Accordingly, the controlling action can be switched between the action of attenuating the effect of external interference inputted from the tie rod and the steering action, and thereby the electric power steering apparatus can favorably minimize the effect of external interference on the steering wheel.

DESCRIPTION OF THE NUMERALS

1. Controller unit
3. Vehicle speed sensor
5. Motor driver circuit
6. Electric motor
8. Steering angular velocity sensor
12. Function generator (first controlling means)
13. Adding means
15. Subtracting means
16. Motor voltage calculator
17. Third-order highpass filter (phase advancing filter means)
18. Control amount map (second controlling means)
19. Multiplying means
21. Torque sensor
22. Torque gain map (torque gain outputting means)
23. Steering angular velocity gain map (angular velocity gain outputting means)
24. Vehicle speed gain map (vehicle speed gain outputting means)
Ic. Target current (control amount).

DETAILED DESCRIPTION

Embodiments will be described with reference to the relevant drawings.

Figure 1:
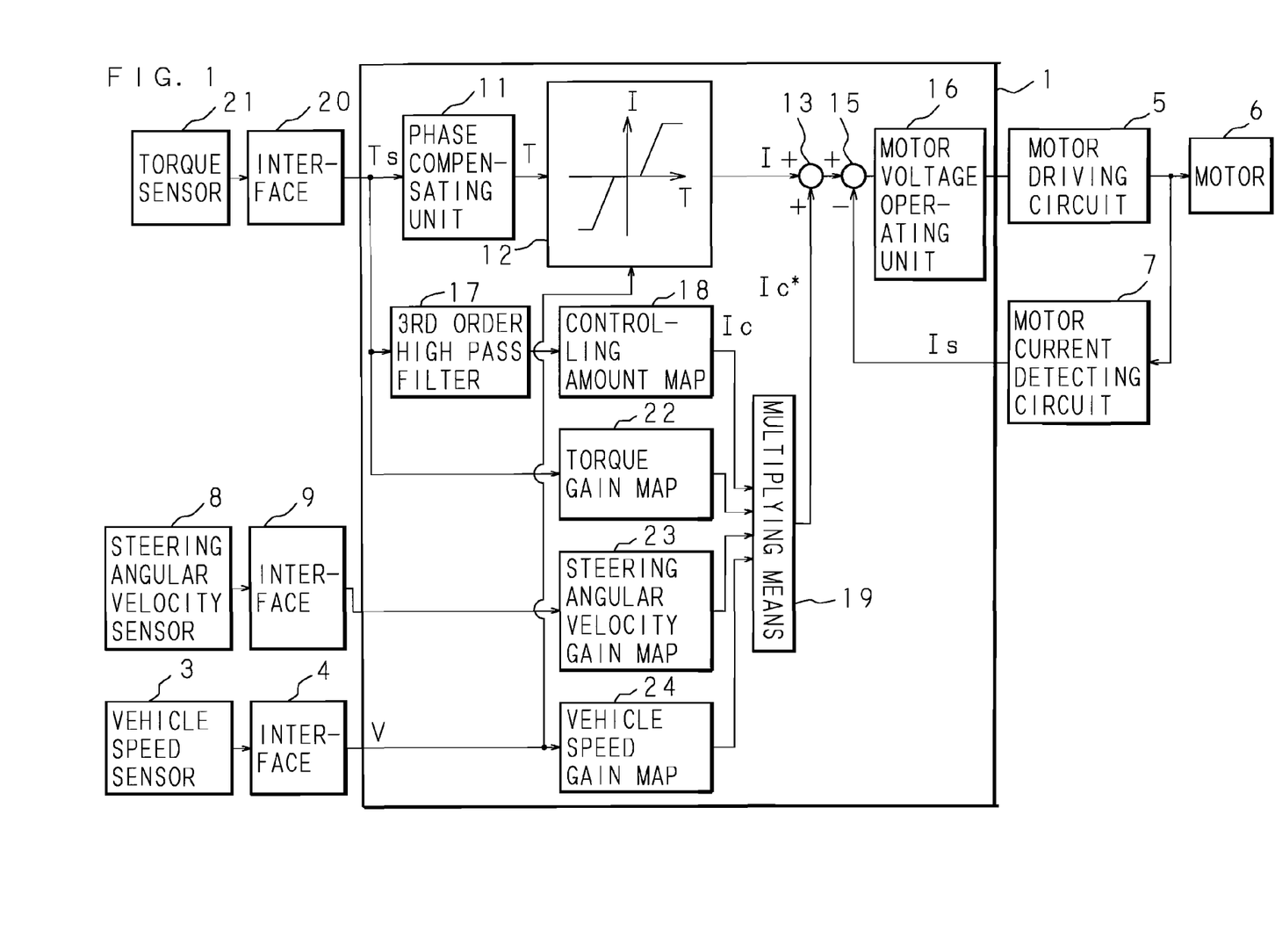
FIG. 1 is a block diagram showing an essential part of an electric power steering apparatus according to one embodiment.

FIG. 1 is a block diagram showing an essential part of an electric power steering apparatus according to one embodiment. The electric power steering apparatus of the embodiment is configured such that a steering torque signal is outputted from a torque sensor 21 which detects the steering torque exerted on a steering member (a steering wheel) (not shown), and sampled by an interface 20 which in turn is delivered as a sampled steering torque signal Ts to a phase compensator 11. The phase compensator 11 is provided for phase compensating the steering torque signal Ts. A resultant phase compensated steering torque signal T from the phase compensator 11 is then provided to a function generator 12 (first controlling means, first output unit).

To the function generator 12, a vehicle speed signal V outputted from a vehicle speed sensor 3 which detects the running speed of the vehicle and sampled by an interface 4 is also provided.

The function generator 12 is configured to have a function variable with the vehicle speed signal V so that, as the steering torque signal T exceeds a predetermined dead zone shown in the drawing, the target current I (control amount, first control amount) increases in proportion to the increase of the steering torque signal T, and when the steering torque signal T reaches a predetermined level, the target current I is saturated. According to the function, the ratio of the target current I to the steering torque signal T becomes smaller and the saturated value of the target current I is thus declined as the vehicle speed signal V increases.

The target current I determined by the function generator 12 is then transferred to adding means 13.

The sampled steering torque signal Ts is also provided to a third-order highpass filter 17 (phase advancing filter means, for example, a combination of three RC filters). The third-order highpass filter 17 has an input/output characteristic in response to the frequency of the steering torque signal Ts as shown in a board profile of FIG. 2. For example, when the frequency of the provided steering torque signal Ts (including a third-order component) is lower than 7.5 Hz, the steering torque signal Ts is attenuated and then outputted, thereby preventing any increase in the sense of physical resistance to the steering action.

Figure 2:
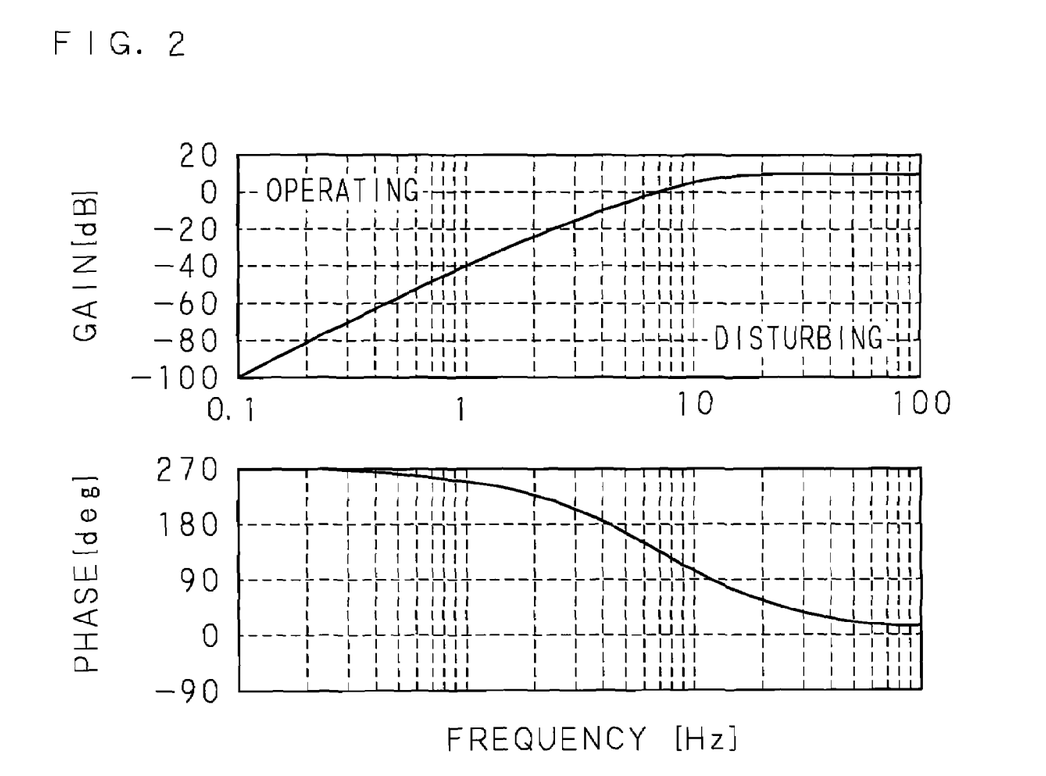
FIG. 2 is a board profile showing the input/output characteristic of a third-order highpass filter.

Also, when the frequency of the steering torque signal Ts (including a third-order component) is higher than 10 Hz, the steering torque signal Ts is amplified by the gain of 1 or more with its phase advanced 90 to 0 degree, and is outputted. As the result, the target current I is added with a target current Ic (control amount, second control amount) outputted from a control amount map (second output unit) 18, which will be described later, thus to minimize the effect of external interference, reducing the effect on the steering action due to the external interference. Alternatively, the third-order highpass filter 17 may be replaced by a second-order filter or a fourth- or higher-order high pass filter.

Figure 3:
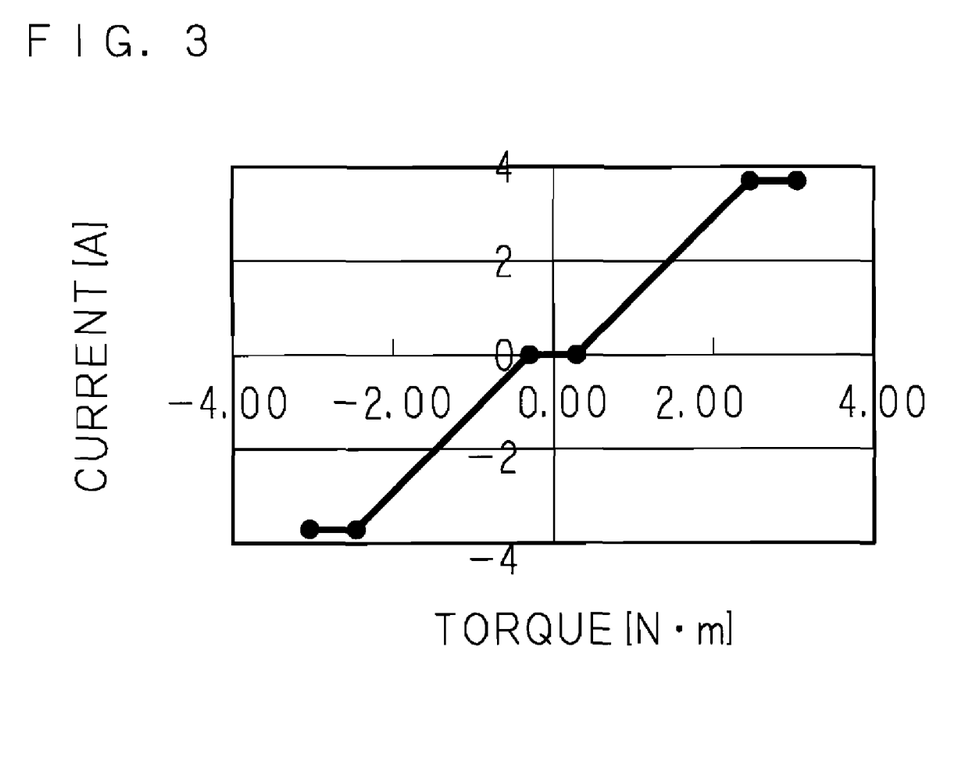
FIG. 3 is a characteristic profile showing the input/output characteristic of a control amount map.

The steering torque signal Ts outputted from the third-order highpass filter 17 is provided to the control amount map 18 (second controlling means, second output unit). The control amount map 18 is provided with a function of which the dead zone is wider, as shown in FIG. 3, and can output the target current Ic (control amount, second control amount) corresponding to the steering torque signal Ts. The effect of physical resistance to the common steering action which is slow can be prevented from increasing by the control amount map 18 in which the dead zone of the steering torque signal Ts is widened.

Figure 4:
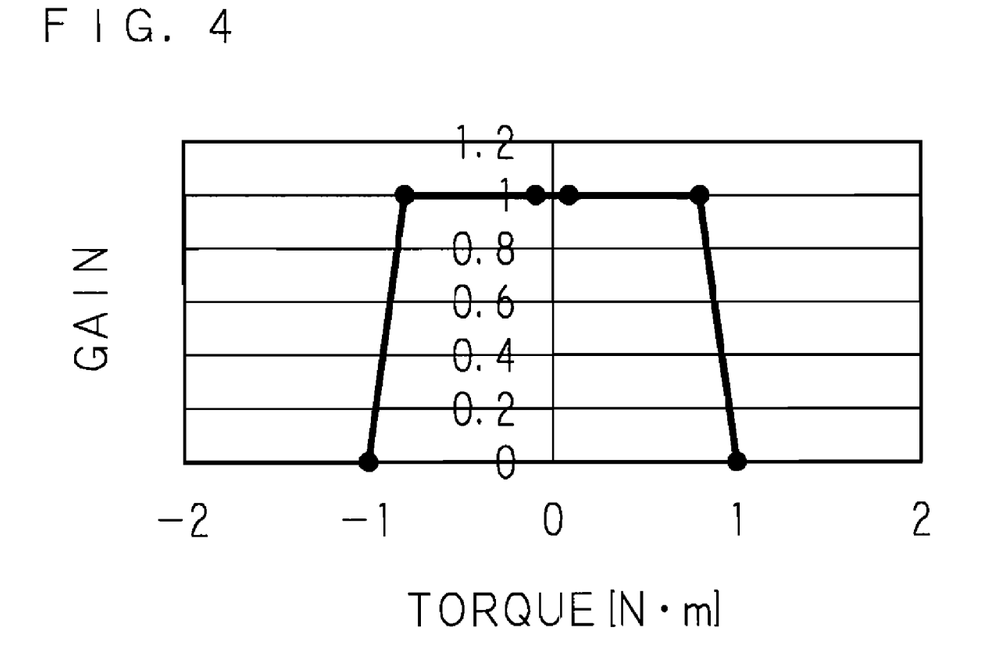
FIG. 4 is a characteristic profile showing the input/output characteristic of a torque gain map.

The steering torque signal Ts is also provided to a torque gain map 22 (torque gain outputting means, first gain data output unit). The torque gain map 22 is arranged for, only when the provided steering torque signal Ts is in a range of, e.g., −1.0 to +1.0 N·m, outputting gain data as shown in FIG. 4 (for example, 0-1 when −1.0 to −0.9 N·m, 1 when −0.9 to +0.9 N·m, and 1-0 when 0.9 to 1.0 N·m). Accordingly, when the steering action is greater (out of the range of −1.0 to +1.0 N·m), the external interference can be minimized thus declining the effect of physical resistance to the steering action.

Figure 5:
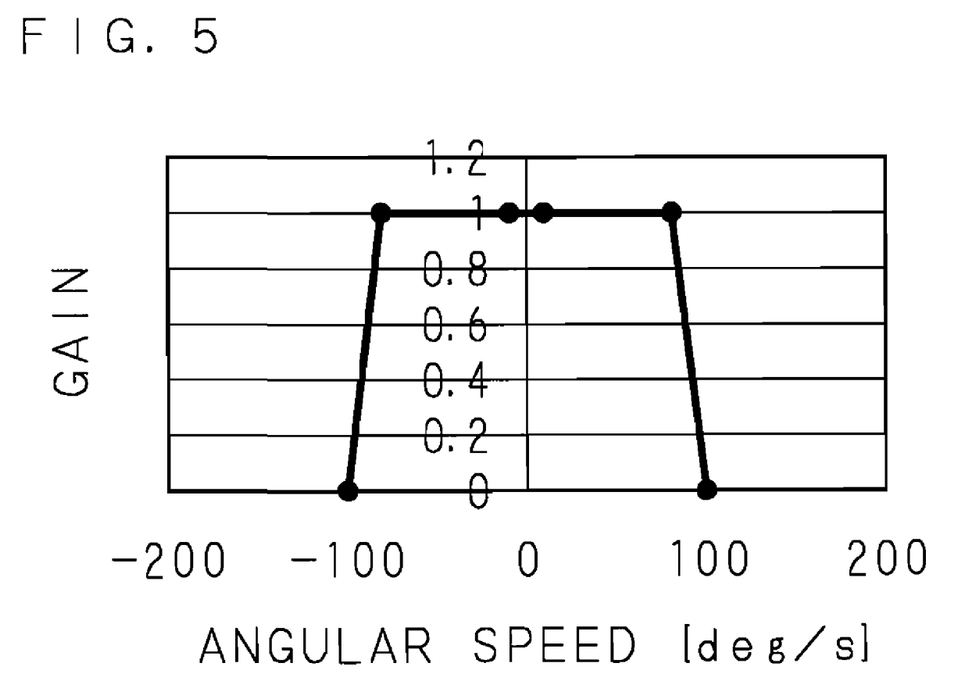
FIG. 5 is a characteristic profile showing the input/output characteristic of a steering angular velocity gain map.

A steering angular velocity signal outputted from a steering angular velocity sensor 8 and sampled by an interface 9 is transferred to a steering angular velocity gain map 23 (angular velocity gain outputting means, second gain data output unit). The steering angular velocity gain map 23 is arranged for, only when the provided steering angular velocity signal is in a range of, e.g., −100 to +100 deg/s, outputting gain data as shown in FIG. 5 (for example, 0-1 when −100 to −90 deg/s, 1 when −90 to +90 deg/s, and 1-0 when 90 to 100 deg/s). Accordingly, when the steering action is faster (out of the range of −100 to +100 deg/s), the external interference can be minimized thus declining the effect of physical resistance to the steering action.

Figure 6:
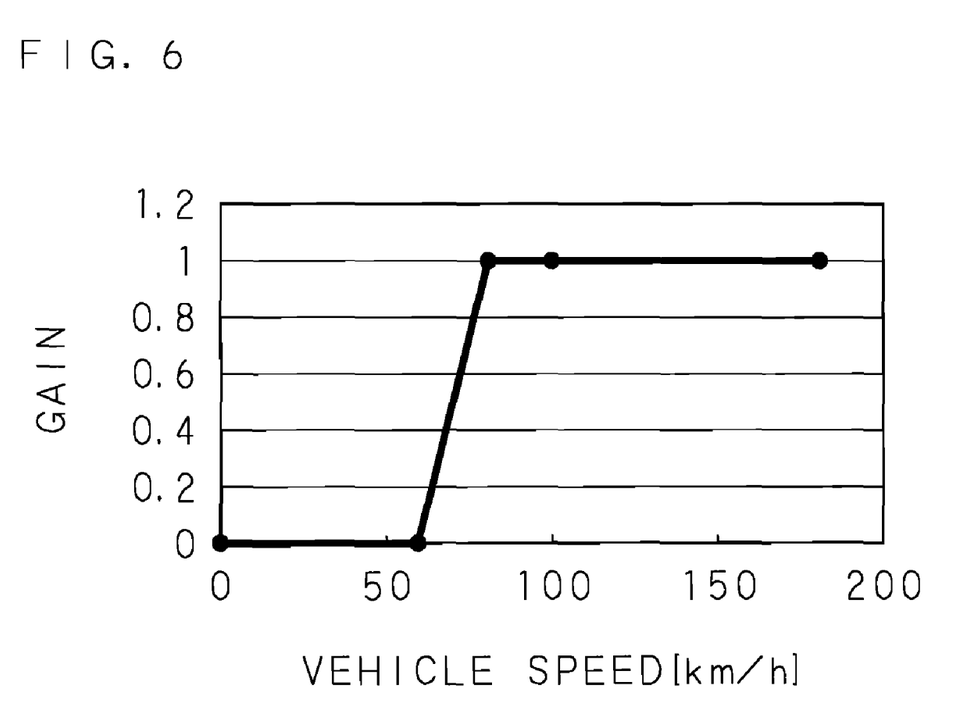
FIG. 6 is a characteristic profile showing the input/output characteristic of a vehicle speed gain map.

The vehicle speed signal outputted from the vehicle speed sensor 3 and sampled by the interface 4 is transferred to a vehicle speed gain map 24 (vehicle speed gain outputting means, third gain data output unit). The vehicle speed gain map 24 is arranged for, only when the vehicle speed signal is higher than, e.g., 60 km/h, outputting a gain data as shown in FIG. 6 (for example, 0-1 when 60 to 80 km/h and 1 when 80 km/h and higher).

The target current Ic from the control amount map 18, the gain data from the torque gain map 22, the gain data from the steering angular velocity gain map 23, and the gain data from the vehicle speed gain map 24 are transferred to multiplying means 19 where they are multiplied. A resultant product is then transferred to the adding means 13 where it is added with the target current I determined by the function generator 12. A resultant sum from the adding means 13 is transferred to subtracting means 15.

To the subtracting means 15, a motor current detection signal Is outputted from a motor current detector circuit 7 that detects the current in an electric motor 6 for the steering assisting action, is also provided.

The subtracting means 15 subtracts the motor current detection signal Is from the sum received from the adding means 13 and its resultant difference is provided to a motor voltage calculator 16. The motor voltage calculator 16 subjects the resultant difference to a PID calculating action and its result is transferred in the form of a PWM signal to a motor driver circuit 5. In response to the PWM signal, the motor driver circuit 5 drives the electric motor 6.

The phase compensator 11, the function generator 12, the third-order highpass filter 17, the control amount map 18, the torque gain map 22, the steering angular velocity gain map 23, the vehicle speed gain map 24, the multiplying means 19, the adding means 13, the subtracting means 15, and the motor voltage calculator 16 are assembled to configure a controller unit 1. The controller unit 1 may be implemented by a software function of a microcomputer or by a hardware arrangement with no use of the microcomputer.

The operation of the electric power steering apparatus having the above described arrangement will be described.

The controller unit 1 first reads the sampled steering torque signal Ts, the steering angular velocity signal, the vehicle speed signal V, and the motor current detection signal Is. The steering torque signal Ts is provided to the third-order highpass filter 17 and the torque gain map 22. The phase compensator 11 subjects the steering torque signal Ts to the phase compensating action and its resultant compensated steering torque signal T is provided to the function generator 12.

The function generator 12 determines the target current I from the steering torque signal T received from the phase compensator 11 and the vehicle speed signal V with the use of its function and outputs it.

The third-order highpass filter 17 processes the sampled steering torque signal Ts with the frequency characteristic (FIG. 2), and provides it to the control amount map 18 (second controlling means).

The control amount map 18 determines the target current Ic (control amount) from the steering torque signal Ts with the use of its function (FIG. 3), and outputs it.

The torque gain map 22 outputs gain data having the characteristic profile (FIG. 4) based on the read steering torque signal Ts.

The steering angular velocity gain map 23 outputs gain data having the characteristic profile (FIG. 5) based on the read steering angular velocity signal.

The vehicle speed gain map 24 outputs gain data having the characteristic profile (FIG. 6) based on the read vehicle speed signal.

The multiplying means 19 subjects the target current Ic from the control amount map 18, the gain data from the torque gain map 22, the gain data from the steering angular velocity gain map 23, and the gain data from the vehicle speed gain map 24 to its multiplying action and its resultant product Ic* is transferred to the adding means 13.

When the frequency of the steering torque signal Ts (including a third-order component) is higher than 10 Hz as having been disturbed by any external interference, the resultant product from the multiplying means 19 is expressed by:

(control amount with advance of 0 to 90 degrees)×
(torque gain×steering angular velocity gain=1)=
(control amount advanced by 0 to 90 degrees).

When the frequency of the steering torque signal Ts (including a third-order component) is within a range of 0.1 to 3 Hz with the steering action conducted slowly (at 0.1 to 1 Hz of the steering frequency), assuming that the frequency of the steering torque signal Ts ranges from 0 to 7.5 Hz in the normal steering action, the resultant control amount is expressed by:

(control amount at 0 in dead zone of control amount
map)×(torque gain×steering angular velocity
gain=0-1)=(control amount=zero).

When the frequency of the steering torque signal Ts (including a third-order component) is within a range of 1 to 7.5 Hz with the steering action conducted quickly (at 1 to 2.5 Hz of the steering frequency), the resultant control amount is expressed by:

(control amount slightly declined with advance of 120
to 240 degrees)×(torque gain×steering angular
velocity gain=0-1)=(control amount=zero).

As described, the resultant product calculated by the multiplying means 19 is equal to a control amount with advance of 0 to 90 degrees when the steering torque signal Ts is disturbed by the effect of external interference, or is zero when the steering torque signal Ts remains not disturbed.

Accordingly, when the steering torque signal Ts is disturbed by the effect of external interference, the resultant sum calculated by the adding means 13 turns to a 0-90 degrees advanced form of the target current Ic thus minimizing the effect of external interference. When the steering torque signal Ts has not been disturbed by the effect of external interference, the target current I determined by the function generator 12 remains unchanged thus giving no sense of interruption during the steering action.

The resultant sum from the adding means 13 is transferred to the subtracting means 15 where the motor current detection signal Is is subtracted from the resultant sum and its resultant difference is provided to the motor voltage calculator 16. The motor voltage calculator 16 subjects the resultant difference to a PIC calculating action and its calculated result is provided as a PWM signal to the motor driver circuit 5. In response to the PWM signal, the motor driver circuit 5 drives the electric motor 6.

Figure 7:
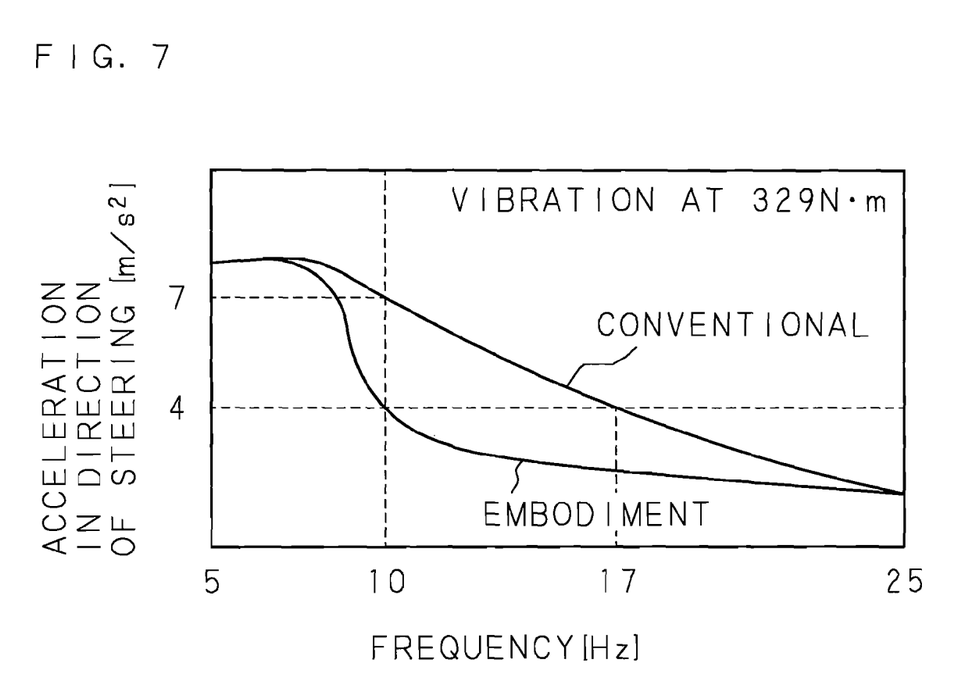
FIG. 7 is a characteristic profile showing the result of a bench test of the electric power steering apparatus according to one embodiment.

FIG. 7 is a characteristic profile of the result of a bench test where the vehicle shaft joined integrally to the rack of a rack-pinion type of the steering system implemented by the electric power steering apparatus of the embodiment is loaded at one end with a vibrated force of external interference (at 329 N·m).

As apparent from the profile of FIG. 7, the degree of acceleration along the circumference of the steering wheel at or higher than 10 Hz remains not greater than 4 m/s$^2$ and the effect of external interference can thus favorably be suppressed.

INDUSTRIAL APPLICABILITY

The above-mentioned disclosure is thus applicable to an electric power steering apparatus which can detect the torque applied to a steering member and controllably drive an electric motor for assisting the steering action according to the detected torque.

The invention claimed is:

1. An electric power steering apparatus comprising:
a torque sensor for detecting torque applied to a steering member and outputting a torque signal in accordance with the detected torque;
a first output unit for outputting a first control amount in accordance with the outputted torque signal, except in a dead zone thereof;
an electric motor driven based on the first control amount for assisting steering;
a phase advancing filter for advancing a phase of the torque signal in case that a frequency of the torque signal is higher than a first frequency, and attenuating the torque signal in case that the frequency of the torque signal is lower than a second frequency which is lower than the first frequency;
a second output unit for outputting a second control amount in accordance with the torque signal from the phase advancing filter, except in a dead zone thereof;
a first gain data output unit for, when the torque signal outputted by the torque sensor is within a predetermined range, outputting gain data in accordance with the torque signal outputted by the torque sensor;
a steering angular velocity sensor for detecting and outputting the steering angular velocity of the steering member;
a second gain data output unit for, when the steering angular velocity outputted by the steering angular velocity sensor is within a predetermined range, outputting gain data in accordance with the steering angular velocity;
an interface for outputting a vehicle speed of a vehicle provided with the electric power steering apparatus;
a third gain data output unit for, when the vehicle speed outputted by the interface is equal to or greater than a predetermined value, outputting gain data in accordance with the vehicle speed;
a multiplying unit for producing a product formed by multiplying the gain data outputted by the first gain data output unit, the gain data outputted by the second gain data output unit, the gain data outputted by the third gain data output unit, and the second control amount outputted by the second output unit; and
an adding unit for adding the product produced by the multiplying unit to the first control amount for updating the first control amount.

2. An electric power steering apparatus according to claim 1, wherein the first frequency is 10 Hz and the second frequency is 7.5 Hz.

3. The electric power steering apparatus according to claim 1, wherein the first and second output units output the first and second control amounts that are substantially equal to zero, when the torque signals to the first and second output units are in dead zone, respectively.

4. The electric power steering apparatus according to claim 1, wherein, when the torque signal outputted by the torque sensor is beyond the predetermined range, the first gain data output unit outputs the gain data that is substantially equal to zero.

5. The electric power steering apparatus according to claim 1, wherein, when the steering angular velocity outputted by the steering angular velocity sensor is beyond the predetermined range, the second gain data output unit outputs the gain data that is substantially equal to zero.

6. The electric power steering apparatus according to claim 1, wherein, when the vehicle speed outputted by the interface is smaller than the predetermined value, the third gain data output unit outputs the gain data that is substantially equal to zero.

7. An electric power steering apparatus according to claim 1, further comprising: a motor current detecting circuit for detecting a motor current and outputting a motor current detection signal; and a subtracting unit for subtracting a control amount, which the motor current detection signal represents, from the first control amount for updating the first control amount.

* * * * *